United States Patent Office 3,147,299
Patented Sept. 1, 1964

3,147,299
PROCESS FOR MAKING DIPHOSPHONATES
John C. Smith and Brad H. Miles, Lake Jackson, Tex., assignors to The Dow Chemical Company, Midland, Mich., a corporation of Delaware
No Drawing. Filed July 26, 1962, Ser. No. 212,724
3 Claims. (Cl. 260—461)

This invention relates to a process for the preparation of diphosphonates and more specifically it relates to their preparation from cyclic alkylene halophosphites.

It is an object of the present invention to set forth a process for the production of esters having the formula

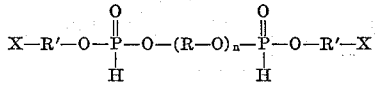

wherein R is an alkylene radical containing from 2 to about 6 carbon atoms, $n$ is an integer from 1 to about 3 and R' is an alkylene radical containing 2 to about 6 carbon atoms, and X is halogen such as bromine or chlorine.

These and other objects are accomplished by reacting a cyclic alkylene halophosphite with a glycol. This reaction can be represented by the equation

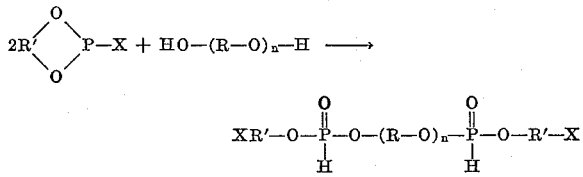

wherein R, R', $n$ and X are as defined above. This process allows a high degree of versatility in preparing predetermined products.

The reactants are preferably employed in an amount such that the exact equivalence is maintained as near as possible, i.e., there should be 1 hydroxyl group for each halogen in the phosphite. If an excess of glycol is used, products containing hydroxyl groups will be formed and if an excess of phosphite is used, products containing active halogen will be formed.

Preferably, the reaction, which is essentially quantitative with regard to yield, is run at a temperature in the range of from 0° to 30° C. but temperatures as high as 50° may be used as well as temperatures as low as —10° C. If the temperature much exceeds 50° C., side reactions occur which produce acidic by-products. In general, the reaction is preferably run at atmospheric pressure.

In carrying out the reaction it is preferred, though not necessary, to use an inert organic solvent as a reaction medium. Suitable solvents include halogenated aliphatic hydrocarbons and aromatic hydrocarbons.

The dihydroxy compounds or glycols useful in the process are those of the type HO—(R—O)$_n$—H wherein $n$ and R are as defined above. Representative compounds include ethylene glycol, diethylene glycol, propylene glycol, dipropylene glycol, 1,2-butanediol, 1,4-butanediol, 1,6-hexanediol, etc.

The alkylene halophosphites useful in the invention include the chloro- and bromo-phosphites wherein the alkylene radical contains from 2 to about 6 carbon atoms and the two valences are separated by 2 or 3 carbon atoms. Such compounds include ethylene, propylene, trimethylene, 1,2-, 1,3- and 2,3-butylene and 1,2-, 1,3-, 2,3- and 2,4-hexylene halophosphites and the like. Some of these are known compounds [e.g. see Chem. Abstr., 42, 2924; J. Am. Chem. Soc., 72, 5491 (1950); Izvest Akad. Nauk, S.S.S.R. Otdel. Khim. Nauk, 1952, 770]. Others can be made by the general methods taught in the above references by substitution of the appropriate glycol or phosphorus halide. Example 1, below, illustrates a suitable method for making a typical alkylene halophosphite. All parts are by weight unless otherwise specified.

EXAMPLE 1.—PREPARATION OF ETHYLENE CHLOROPHOSPHITE

Into a reaction vessel equipped with a means for stirring, temperature control, purging, reactant addition, and refluxing were placed 175 parts of PCl$_3$ and 400 parts of methylene chloride. To this mixture were added dropwise 112 parts of ethylene glycol at room temperature. However, as addition continued, the evolution of HCl lowered the temperature to 15° C. Upon completing the addition, the mixture was warmed at 35° C. until evolution of HCl was complete. The solvent was removed under reduced pressure, leaving the final product, a clear liquid which distilled at 46–48° C. at 16 mm. of mercury. Yield=86%.

EXAMPLE 2

Ethylene bis(2-chloroethyl phosphonate) was prepared in a reaction vessel equipped according to Example 1 by placing 120 parts of ethylene chlorophosphite and 150 parts of dry benzene therein and adding dropwise 29.4 parts of ethylene glycol. The temperature was maintained at 15° C. and the reaction was completed in 2 hours. The product, an oily liquid, was obtained as a residue by distilling the solvent under reduced pressure.
Analysis.—20.4% PH, 20.8% P, and 21.0% Cl.

Other compounds corresponding to the formula above are obtained by substituting the appropriate alkylene halophosphite and glycol in the procedure of Example 2. Several typical such products, with the appropriate reactants, are shown in Table I.

Table I
BIS-(HALOALKYL PHOSPHONATES)

X—R'—O—P(=O)(H)—O—(R—O)$_n$—P(=O)(H)—O—R'—X

| Ex. | R | R' | X | $n$ | Reactants | |
|---|---|---|---|---|---|---|
| | | | | | Glycol | Halophosphite |
| 3 | Propylene | Ethylene | Cl | 1 | Propylene | Ethylene Chloro-. |
| 4 | Ethylene | do | Cl | 2 | Diethylene | Do. |
| 5 | do | do | Br | 3 | Triethylene | Ethylene Bromo-. |
| 6 | 1,2-Butylene | Propylene | Br | 1 | 1,2-Butylene | Propylene Bromo-. |
| 7 | do | Trimethylene | Cl | 1 | do | Trimethylene Chloro-. |
| 8 | 1,4-Butylene | 1,2-Butylene | Cl | 1 | 1,4-Butylene | 1,2-Butylene Chloro-. |
| 9 | Propylene | 2,4-Hexylene | Cl | 2 | Dipropylene | 2,4-Hexylene Chloro-. |
| 10 | 1,6-Hexylene | 2,3-Butylene | Br | 1 | 1,6-Hexylene | 2,3-Butylene Bromo-. |

The products produced by our process are valuable new compounds, being useful as fire-retarding agents. They are especially useful for this purpose in synthetic resins and plastics, particularly in polyurethane foams. In such applications, as little as 0.5 percent of phosphorus in a foam significantly reduces the combustibility of the foam while 1.75 percent will render most such foams self-extinguishing.

We claim:

1. The process for making a bis(haloalkyl phosphonate) having the formula

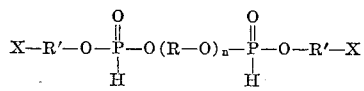

wherein R is an alkylene radical containing 2 to about 6 carbon atoms, R' is an alkylene radical containing 2 to about 6 carbon atoms and having the two valences separated by 2 to 3 carbon atoms, X is a halogen having an atomic number from 17 to 35 and $n$ is an integer from 1 to 3, said process comprising reacting by contacting at about −10 to 50° C. one mole of a glycol having the formula $HO(R-O)_n-H$ solely with substantially 2 moles of an alkylene halophosphite having the formula

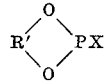

wherein R, R', $n$ and X are as defined above.

2. The process defined in claim 1 wherein the reaction is conducted in an inert organic solvent.

3. The process for making ethylene bis(2-chloroethyl phosphonate) consisting essentially of dissolving two moles of ethylene chlorophosphite in an inert solvent, adding one mole of ethylene glycol to the resulting solution while maintaining the temperature of the solution at about 0° to 30° C. and separating the solvent from the thus formed product.

References Cited in the file of this patent
UNITED STATES PATENTS
2,841,608    Hechenbleikner et al. _____ July 1, 1958